Oct. 16, 1962 — E. RITZHEIMER — 3,058,184
HOOK FOR CHOKER CABLE
Filed June 1, 1959 — 3 Sheets-Sheet 1

INVENTOR.
Earl Ritzheimer
BY
Atty.

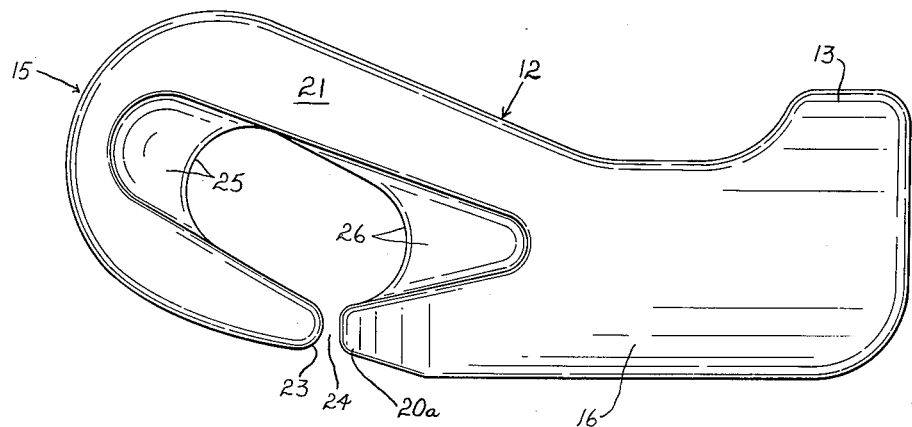
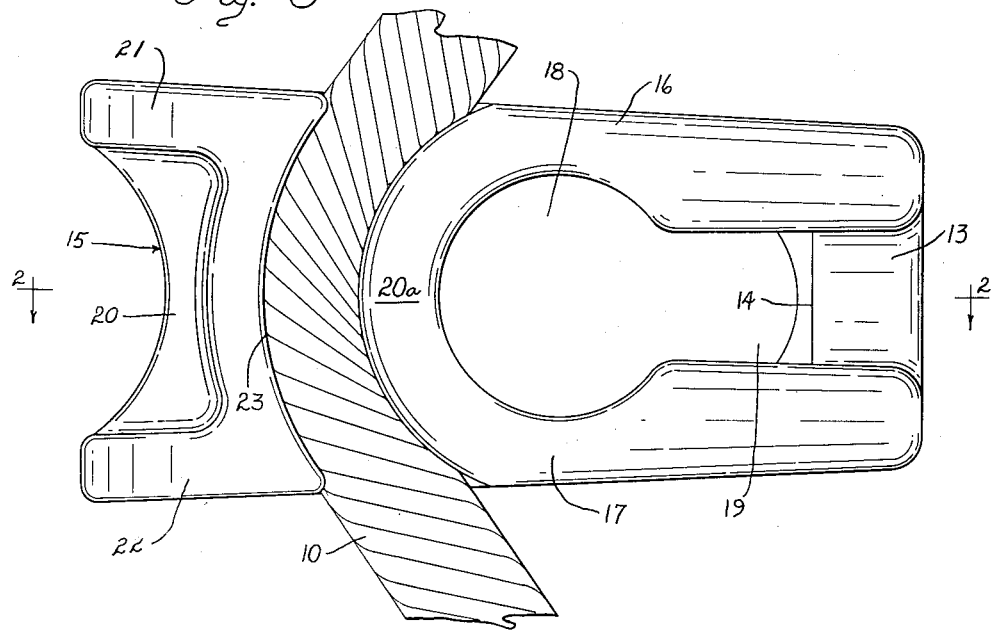

United States Patent Office 3,058,184
Patented Oct. 16, 1962

3,058,184
HOOK FOR CHOKER CABLE
Earl Ritzheimer, Bovill, Idaho
Filed June 1, 1959, Ser. No. 817,283
2 Claims. (Cl. 24—123)

My invention relates to hooks for choker cables and has for its purpose the provision of a hook that can be used to form slip hitches on choker cables such as are used around logs for moving the logs. These cables are cut to desired lengths and have ferrules with enlarged heads firmly fixed thereon. Such choker cables with the end ferrules and hooks to provide slip hitches are used in the logging industry and in other fields where slings are used for handling bulk materials.

It is a specific purpose of my invention to provide a hook for choker cables that can be placed on the cable after the ferrules are in place and once in place on the cable it does not work off in the dragging of the choker cable or other handling thereof, yet it does slip freely back and forth on the cable allowing a slip hitch by attaching either ferrule equipped end of the cable to the hook.

The nature and advantages of my invention will appear more fully from the following description and the accompanying drawings wherein the preferred form of my invention is shown.

In the drawings:

FIGURE 4 is a side view of the hook;

FIGURE 5 is a front face view of the hook looking at the face through which the cable is inserted to mount the hook on the cable.

Figure 1:
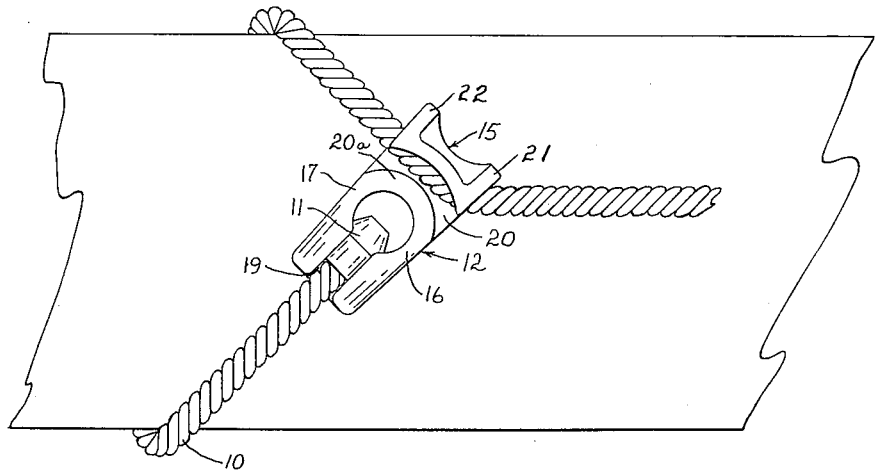
FIGURE 1 is a somewhat diagrammatic side view of a section of a log having a choker cable around it, using my hook for choker cables to provide the slip hitch by which the choker cable can be drawn tight around the log.

In the use of choker cables it is common to provide each cable 10 with ferrules 11 at both ends. The length of cable is placed around the object to be moved and is secured by a slip hitch that embodies the hook 12. This hook 12 is the subject matter of the present invention. The hook 12 must slide freely on the cable 10. Heretofore the hooks most commonly used had an eye through which the cable passed. In order to keep from losing the hook this eye had to be smaller than the ferrules. In order to put a hook on a cable one ferrule had to be removed, or the hook had to be placed on the cable before the ferrule was applied. In case of hook breakage a cable could not be used again until it went to the shop. A hook has been developed that will enable the hook to be placed directly on the cable by running the ferrule through the hook. However, it does not avoid loss of hooks in dragging cables and it is weakened severely by the provision of the large passage necessary for the ferrule to go through it.

My hook has its ferrule attaching portion provided with a U-shaped base 13, on the inside of which there is a ferrule engaging ledge 14 on which the ferrule 11 seats. The cable guiding portion 15 of the hook is connected to the base 13 by two main legs 16 and 17 which, as shown, provide a passage 18 through which the ferrule 11 can pass and a narrow passage 19 to receive the cable 10 when the ferrule 11 is being seated on the ledge 14.

The cable guiding portion 15 comprises a curved web portion 20 that connects the legs 16 and 17 to each other. This web portion has a heavy rib 20a that extends from the leg 16 to the leg 17 and forms a semi-circular wall of the passage 18. The portion 15 has sides 21 and 22 forming extensions of the legs 16 and 17 and diverging from each other to the end of the hook farthest from the base 13. The web portion 20 is extended between the sides 21 and 22 and connects them. The web portion 20 is curved transversely of the hook to provide a smooth concave outwardly facing surface.

Figure 2:
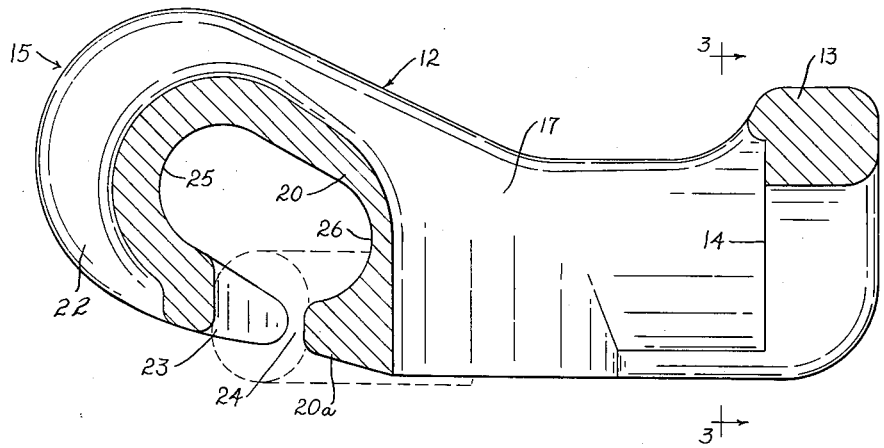
FIGURE 2 is an enlarged sectional view taken longitudinally through the hook with a cable in process of insertion into the hook being indicated in dotted lines.
Figure 3:
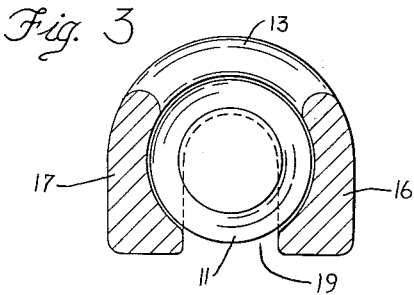
FIGURE 3 is a sectional view on a reduced scale taken on the line 3—3 of FIGURE 2.
Figure 6:
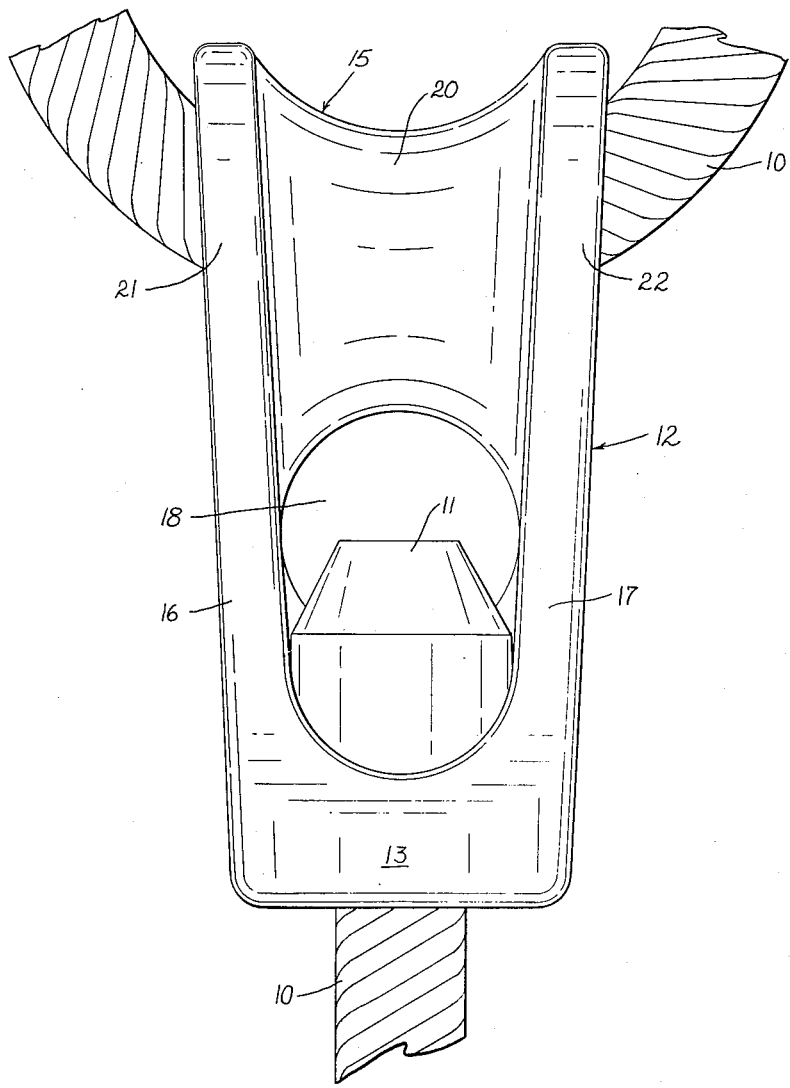
FIGURE 6 is a rear face view of the hook with the cable attached.

The sides 21 and 22 and the web portion 20 are hooked over toward the rib 20a and terminate in a curved lip 23 concentric with and spaced from the rib 20a to provide a narrow slot 24 through which a cable 10 may be worked to provide a slip hitch. The distance across the slot 24 is made slightly less than the diameter of the cable used. For example, this distance would be made ⅝ inch for a ¾ inch cable. To put the hook on a cable 10 that already has ferrules 11 at both ends the cable must be flattened as indicated in dotted lines in FIGURE 2 and forced through the curved slot 24. The interior surfaces 25 and 26 of the portion 15 are smooth, curved convex surfaces which will guide the cable 10 as it slides through the portion 15. The surface 25 is, of course, the one that receives most of the wear in use.

In view of the curved contour of the slot 24 and its extension all the way across the wide guiding portion 15, it is practically impossible for the hook to free itself accidentally from a choker cable 10 on which it is placed. It can be put on a cable that has ferrules on both ends and a ferrule cannot possibly go through the cable guiding portion 15.

It will be noted that the portion 15 is angularly displaced with respect to the axis of the base 13. This gives the hook additional strength and enables both the portion 15 and the base 13 to bear against a log surface when the choker cable is tightened about the log avoiding bending strains. This feature also helps to keep the hook from bouncing around on the cable when the cable is dragged behind a tractor to the woods.

A particular advantage of my choker cable hook lies in the strength that is obtained while maintaining the hook free to receive a cable through the slot 24. It will be noted that the ferrule seating base 13 is carried by the legs 16 and 17 which extend to and join the sides 21 and 22 of the cable guiding portion 15, providing direct force transmission lengthwise of these members. Ample strength to resist spreading is provided by the web 20 and the rib 20a. The hole through which the ferrules must go to seat in the base 13 is completely separated from the passage through the cable guiding portion 14 by the cross rib 20a and the web 20. The wide solid web 20 insures adequate strength in the guiding portion 15. The legs 16 and 17, with the rib 20a and the bottom of the web 20, provide a U-shaped ferrule receiving body having a semi-circular base and having the legs connected at their ends by the ferrule seating base member 13. The web 20 and the sides 21 and 22 provide a hook-shaped cable guide integral with the base of the U-shaped ferrule receiving body, the cable guide having its free lip 23 curved concentrically with the rib 20a and spaced from the rib 20a to allow entry of a curved cable into the guide.

With this construction the choker cable 10 can be delivered to the job from the factory with the ferrules 11 permanently affixed thereon and can be completed at the job by putting the shank or cable guide portion 15 of the hook 12 on the cable. This will allow a loop to be formed at either end of the cable by inserting one ferrule into the opening 18 and seating it on the seat 14.

The construction of the hook 12 described hereinbefore is such that the contour of the opening or slot 24 prevents a cable inserted through the slot 24 from thereafter accidentally lining up with the slot 24 and slipping off the cable. I can also now retain a supply of hooks out in the woods at all times and apply them to new cables in case a cable breaks or loses a ferrule. I can also put a new hook on an old cable if a hook gets crushed or broken.

It is believed that the nature and advantages of my invention will be apparent to those skilled in the art to which it pertains.

Having described my invention, I claim:

1. A choker cable hook comprising a ferrule receiving base, a pair of spaced legs, each of said legs being formed integrally at one end with said base, a hook shaped cable guide including a curved web formed integrally with the remaining ends of said legs, said web having a convex inner surface, said web terminating at one edge in a curved rib connecting said legs and termiating at its opposite edge in a lip curved concentrically with and facing said rib and spaced therefrom to provide a slot for entry of a curved length of cable into the guide, the inner surface of said web defining an opening capable of freely receiving a cable, said slot being substantially narrower throughout its length than the smallest dimension across the opening defined by the inner surface of said guide.

2. The hook as defined in claim 1 wherein said rib has a convex configuration and wherein said lip has a concave configuration.

References Cited in the file of this patent

UNITED STATES PATENTS

| | | |
|---|---|---|
| 1,649,654 | Benson | Nov. 15, 1927 |
| 1,651,081 | Bardon | Nov. 29, 1927 |
| 1,741,463 | Hickok | Dec. 31, 1929 |
| 2,187,440 | Adolphe | Jan. 16, 1940 |
| 2,356,908 | Arrowsmith | Aug. 29, 1944 |
| 2,592,696 | Hoody | Apr. 15, 1952 |
| 2,793,066 | Rue | May 21, 1957 |
| 2,872,716 | Ehmann et al. | Feb. 10, 1959 |

FOREIGN PATENTS

| | | |
|---|---|---|
| 1,106,059 | France | July 13, 1955 |